United States Patent [19]

Nakayama et al.

[11] Patent Number: 4,626,083
[45] Date of Patent: Dec. 2, 1986

[54] ELECTRICALLY FOLDABLE DOOR MIRROR

[75] Inventors: Kiyoshi Nakayama; Yasutoshi Ito; Toshiyuki Kumai, all of Shizuoka, Japan

[73] Assignee: Murakami Kaimeido Co., Ltd., Shizuoka, Japan

[21] Appl. No.: 745,663

[22] Filed: Jun. 17, 1985

[30] Foreign Application Priority Data

Feb. 19, 1985 [JP] Japan ................................. 60-29472

[51] Int. Cl.⁴ ............................................... G02B 7/18
[52] U.S. Cl. ................................................... 350/604
[58] Field of Search ............... 350/604, 605, 606, 632, 350/633, 637; 248/480

[56] References Cited

U.S. PATENT DOCUMENTS

| | | | |
|---|---|---|---|
| 3,937,563 | 2/1976 | Frabe | 248/480 X |
| 4,158,483 | 6/1979 | Fisher et al. | 350/633 X |
| 4,380,370 | 4/1983 | Mittelhauser | 248/475.1 X |
| 4,464,017 | 8/1984 | Wada | 350/604 |
| 4,504,116 | 3/1985 | Sharp | 350/637 |
| 4,558,930 | 12/1985 | Deedreek | 350/604 |

*Primary Examiner*—Donald Watkins
*Attorney, Agent, or Firm*—Michael J. Striker

[57] ABSTRACT

An electrically foldable door mirror comprising a base, a shaft erected on said base, a mirror body rotatably attached to said shaft, electric driving means for turning said mirror body, a pinion secured to the output shaft of said electric driving means, said pinion being engaged with a clutch gear attached to the upper portion of said shaft, means for automatically stopping said electric driving means, said stopping means being disposed between one surface of a fixed clutch fixed to the upper end of said shaft and a surface of said mirror body opposing said one surface of the fixed clutch, said stopping means comprising a printed circuit and contact pieces slidable thereon. The mirror body in the erected neutral position can be turned backward by actuating the electric driving means. When the mirror body has come to the position of the rear turning limit, the electric driving means is automatically stopped by the stopping means. The mirror body in the position of the rear turning limit can be returned to the erected neutral position by reversing the electric driving means. When the mirror body has come to the erected neutral position, the electric driving means is automatically stopped by the stopping means.

4 Claims, 11 Drawing Figures

ELECTRICALLY FOLDABLE DOOR MIRROR

BACKGROUND OF THE INVENTION

1. Field of the Invention

The present invention relates to an electrically foldable door mirror for a motor vehicle. More particularly, the invention relates to an electrically foldable door mirror, whose mirror body is adapted to stop automatically at a normal position or a folded position.

2. Description of the Prior Art

In general, door mirrors of a motor vehicle protrude sideways from the vehicle body more than fender mirrors. Therefore, when a motor vehicle equipped with door mirrors enters a garage or a three-dimensional car park, the door mirrors may hinder its smooth entering or damage the side wall of the garage or the equipment of the car park. To avoid such problems, some door mirrors are folded forward or backward within the outermost line of the vehicle body.

In conventional foldable door mirrors, the vehicle driver has to get out of the vehicle each time he folds them or return them to their normal positions. To prevent such a trouble, some door mirrors are provided, the mirror body of which contains an electric motor and gears, and can be electrically turned by remote control from inside the motor vehicle. In these door mirrors, however, means for automatically stopping the mirror body at a limit of turning by actuating a limit switch, etc. is complicated and expensive.

BRIEF SUMMARY OF INVENTION

It is an object of the invention to provide an electrically foldable door mirror which has obviated the above-mentioned disadvantages of the prior art.

It is another object of the invention to provide an electrically foldable door mirror having means for stopping the mirror body automatically and surely, said means being less expensive to manufacture and easier to attach.

These and other objects have been achieved by an electrically foldable door mirror, in which a pinion of electric driving means is engaged with a clutch gear attached to the upper portion of a shaft, and means for automatically stopping said electric driving means is provided between one surface of a fixed clutch fixed to the upper end of said shaft and a surface of a mirror body opposing said one surface of the fixed clutch, said stopping means comprising a printed circuit and contact pieces slidable thereon.

When the mirror body in the erected neutral position is to be turned backward, a switch provided inside the vehicle is manipulated to actuate the electric driving means through a sequence circuit. When the mirror body is in a movable range, all the contact pieces are in contact with the printed circuit, and therefore the mirror body is turned backward. When the mirror body has come to the position of the rear turning limit, a contact piece for detecting the position of the rear turning limit of the mirror body is disconnected from the printed circuit, and the electric driving means is automatically stopped, thus the mirror body being maintained in the position of the rear turning limit. If the electric driving means is reversed, the mirror body is turned from said position of the rear turning limit to the erected neutral position. When the mirror body has come to the neutral position, a contact piece for detecting the neutral position of the mirror body is disconnected from the printed circuit, and the electric driving means is automatically stopped.

DETAILED DESCRIPTION

An embodiment of the invention will now be described with reference to the attached drawings. It is to be noted that the attached drawings show a right-hand door mirror, drawings of a left-hand door mirror being omitted.

Figure 1:
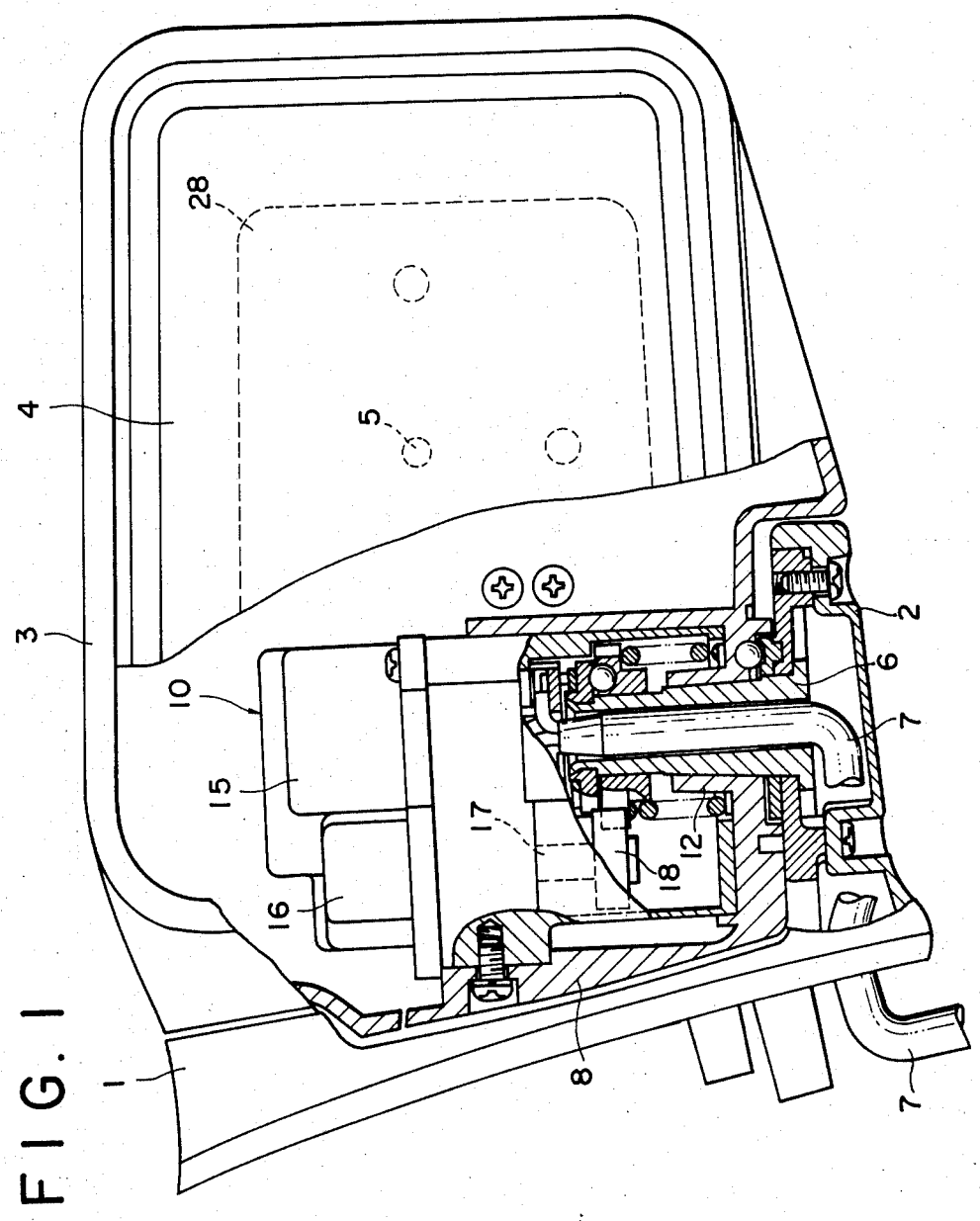
FIG. 1 is a partially cutaway front view of an electrically foldable door mirror according to the present invention.
Figure 2:
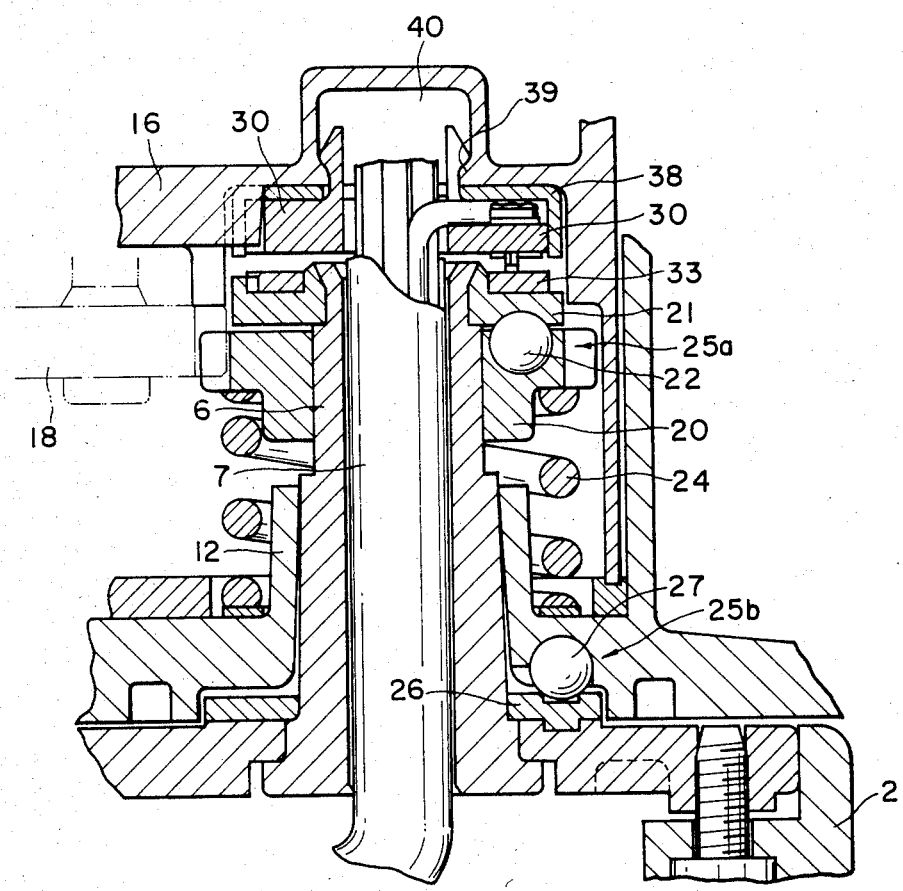
FIG. 2 is an enlarged sectional view showing a portion thereof.

As shown in FIGS. 1 and 2, an electrically foldable door mirror of the invention comprises a base 1 fixed to a door of a motor vehicle, a shaft 6 erected on said base 1, a mirror body 3 rotatably attached to said shaft 6, a pinion 18 of electric driving means 10 being engaged with a clutch gear 20 attached to the upper portion of said shaft 6, means for automatically stopping said electric driving means 10 being provided between one surface of a fixed clutch 21 fixed to the upper end of said shaft 6 and a surface of a mirror body 3 opposing said one surface of the fixed clutch 21, said stopping means comprising a printed circuit and contact pieces slidable thereon.

There are an upper clutch 25a and a lower clutch 25b. A coiled spring 24 is provided around the shaft 6 so as to give a force of engagement to both of the clutches. The door mirror of the invention can be folded not only by automatic operation but also by manual operation.

In automatic operation, a switch provided inside the vehicle is manipulated to actuate the electric driving means 10 through a sequence circuit (not shown). The sequence circuit is controlled by the positions of the contact pieces relative to the printed circuit so as to stop the electric driving means 10 automatically when the mirror body 3 has come to the neutral position (erected position) or the position of the turning limit. In manual operation, the mirror body 3 is forcibly turned by hand with the pinion 18 of the electric driving means 10 engaged with the clutch gear 20 attached to the shaft 6. Then, the lower clutch 25b is disengaged first, and the upper clutch 25a is disengaged next.

When the mirror body 3 receives a strong external shock, both of the upper clutch 25a and the lower clutch 25b are disengaged at the same time so that the mirror body 3 is turned by the external force. In this way, the clutches 25a, 25b are adapted to operate effectively according to the force exerted on the mirror body 3.

Parts of the door mirror will now be described in detail. In FIGS. 1 and 2, numeral 1 represents a base fastened, for example, to the triangular corner of a door window of a motor vehicle by means of screws. Numeral 2 represents a bracket extending approximately horizontally from the lower portion of the base 1. Numeral 3 represents a mirror body. Numeral 4 represents a mirror. Numeral 5 represents a pivot of the mirror 4. Numeral 6 represents a shaft erected on the bracket 2.

Since the mirror body 3 illustrated in FIG. 1 contains an actuator 28 for changing the angle of reflection of the mirror 4, the shaft 6 has a central hole through which a harness 7 for the actuator 28 passes. When the mirror body 3 does not contain such an actuator, the shaft 6 is not required to be hollow.

A frame 8 is secured within the mirror body 3, and said actuator 28 is disposed approximately in the center of the frame 8. The frame 8 supports, near the base 1, electric driving means 10 and a shaft bearing 12 into which the shaft 6 is inserted. The electric driving means 10 comprises a reversible DC electric motor 15 and a gear box 16 containing reduction gears. A pinion 18 is secured to the output shaft 17 of the gear box 16.

As shown in FIG. 2, the shaft bearing 12 of the frame 8 is slightly tapered, and the shaft 6 has a taper portion corresponding thereto. When the shaft bearing 12 of the frame 8 is put on the taper portion of the shaft 6, the whole frame 8 is rotatable and axially slidable with relation to the shaft 6.

The shaft 6 has a cylindrical portion above said taper portion, and a clutch gear 20 engaged with said pinion 18 is attached to the cylindrical portion. The shaft 6 has a narrow portion above said cylindrical portion, and a fixed clutch 21 is fixed to the narrow portion. The opposing surfaces of the clutch gear 20 and the fixed clutch 21 form an upper clutch 25a. The upper clutch 25a may be, as shown in FIG. 2, a ball clutch comprising a plurality of (three, for example) holes respectively provided in the upper surface of the clutch gear 20 and the lower surface of the fixed clutch 21, and balls 22 fitted in said holes. Alternatively the upper clutch 25a may comprise sidge-shaped catches or tooth-shaped catches (not shown).

A coiled spring 24 is disposed around the shaft bearing 12 so as to give a force of engagement to both of said upper clutch 25a and a lower clutch 25b described below.

As shown in FIG. 2, the lower clutch 25b is a ball clutch comprising holes provided in a stopper 26 around the root portion of the shaft 6 and balls 27 fitted in said holes. The engagement of the lower clutch 25b is made weaker than that of the upper clutch 25a by, for example, fitting the balls 27 of the lower clutch 25b more shallowly in the holes or making the balls 27 larger, as compared with the balls 22 of the upper clutch 25a. Thus, for example when the mirror body 3 is turned by hand, the lower clutch 25b is disengaged slightly earlier than the upper clutch 25a so that the mirror body 3 can be turned smoothly.

Means for automatically stopping the electric driving means 10 will now be described.

Figure 3:
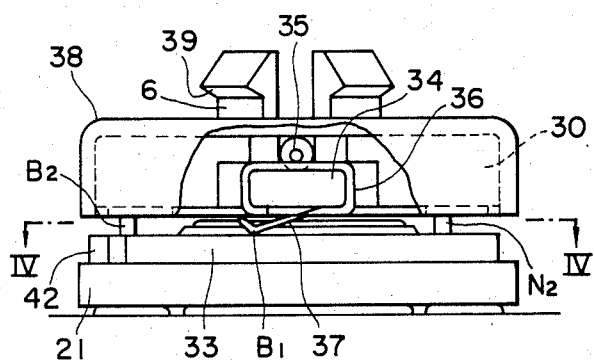
FIG. 3 is a front view of means for automatically stopping electric driving menas.

As shown in FIGS. 2 and 3, the stopping means comprises the fixed clutch 21 fixed to the upper portion of the shaft 6, a printed circuit 33 provided on the upper surface of the fixed clutch 21, a holder 30 attached above the fixed clutch 21 to the pivotal center of the mirror body 3, and four contact pieces 36 provided on the periphery of the holder 30. The holder 30 has a cap 38 on for the protection of said contact pieces 36. The central cylinder of the holder 30 passing through the central hole of the cap 38 has an undercut 39, which is engaged with a recess 40 formed under said gear box 16.

The printed circuit 33 has two arc-shaped conductive plates 31, 32 having different radii, one being disposed on the inside of the other. The conductive plate 31 contacts the contact pieces 36 having contacts $B_1$, $B_2$ of a switch for detecting the position of the rear turning limit. The conductive plate 31 is disposed on the outside of the other conductive plate 32, and has the shape of an arc with an angle of 340°. The conductive plate 32 contacts the contact pieces 36 having contacts $N_1$, $N_2$ of a switch for detecting the neutral position. The conductive plate 32 has the shape of an arc with a shorter length (about 200°, phase being shifted) and a smaller radius as compared with said conductive plate 31.

Figure 4:
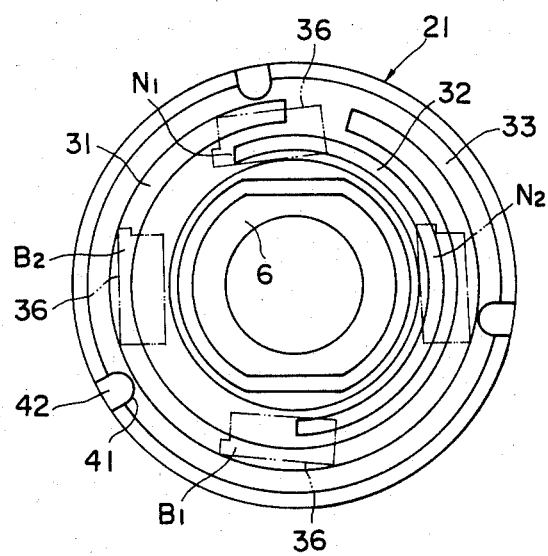
FIG. 4 is a sectional view taken on line IV—IV of FIG. 3.
Figure 5:
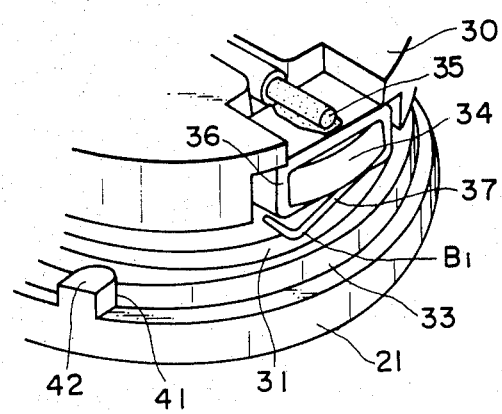
FIG. 5 is a perspective view showing the relation between a contact piece and printed circuit.

The printed circuit 33 is provided on its periphery with three semicircular notches 41, in which projections 42 of said fixed clutch 21 are fitted to prevent rotation (FIGS. 4 and 5).

Figure 6:
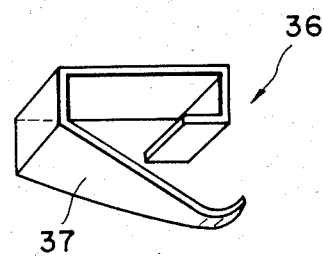
FIG. 6 is a perspective view of said contact piece.

Each contact piece 36 comprises a substantially rectangular main portion and a leg portion 37 extending obliquely downward therefrom (FIG. 6). The main portion is supported on a supporting member 34 provided on the periphery of said holder 30. A terminal 35 is soldered to the upper surface of said main body. See FIGS. 3 and 5.

Figure 7A:
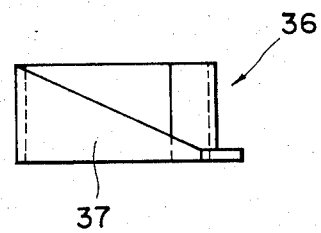
FIG. 7A is a bottom view showing said contact piece disposed in one direction.
Figure 7B:
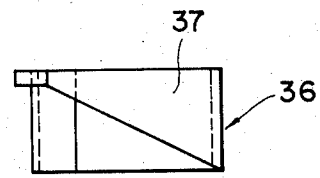
FIG. 7B is a bottom view showing said contact piece disposed in the opposite direction.

Said leg portion 37 of the contact piece 36 has a shape similar to a right-angled triangle when seen from above, a portion near the vertex thereof being bent so as to serve as a contact. The contact is not in the central position of the contact piece 36. The contact contacts the printed circuit 33 at different positions with respect to the radius thereof according as the contact piece 36 is attached to the supporting member 34 in the direction shown in FIG. 7A or in the opposite direction shown in FIG. 7B. That is, the contact of the contact piece 36 is in the opposite positions with respect to the circumferential direction and the radial direction according to the direction in which the contact piece 36 is attached. For example, if the contact pieces 36 having the contacts $N_1$, $N_2$ for detecting the neutral position are attached in the direction shown in FIG. 7A and the contact pieces 36 having the contacts $B_1$, $B_2$ for detecting the position of the rear turning limit are attached in the opposite direction shown in FIG. 7B, then the contact pieces 36 for detecting the neutral position slide on the inner conductive plate 32 and the contact pieces 36 for detecting the position of the rear turning limit slide on the outer conductive plate 31 as shown in FIG. 4.

The operation of the door mirror will now be described.

FIGS. 1 and 2 show the state that the mirror body 3 is erected, that is, the mirror body 3 stays in the normal (neutral) position. In this state, the upper clutch 25a and the lower clutch 25b are respectively engaged by the force of the coiled spring 24. Also, the contact pieces 36 are in contact with the printed circuit 33 as shown in FIG. 4, and the DC electric motor 15 is stopped.

The rotation of the DC electric motor 15 is slowed down by the gear box 16 and transmitted through the pinion 18 to the clutch gear 20 so as to cause relative rotation to the shaft bearing 12 into which the shaft 6 is inserted. Within the range of the torque required for raising the balls 27 from the holes in the stopper 26 around the root portion of the shaft 6 onto the upper surface of the stopper 26 while the balls 27 are held in the holes of the frame 8, the upper clutch 25a between the clutch gear 20 and the fixed clutch 21 is not disengaged. Therefore, the clutch gear 20 is not rotated and the pinion 18 rotates both round the clutch 20 and on its axis so as to turn the mirror body 3.

Figure 8:
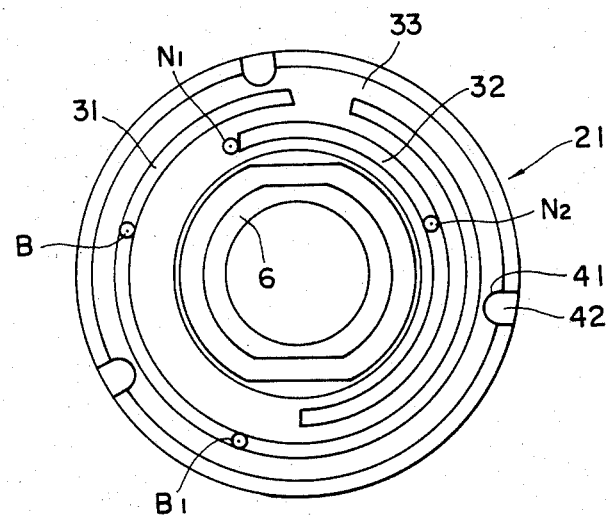
FIGS. 8 to 10 are enlarged plan views showing the positions of contact between contact pieces and said printed circuit when the mirror body is in the neutral position, the position of the rear turning limit, and the position of the front turning limit.
Figure 9:
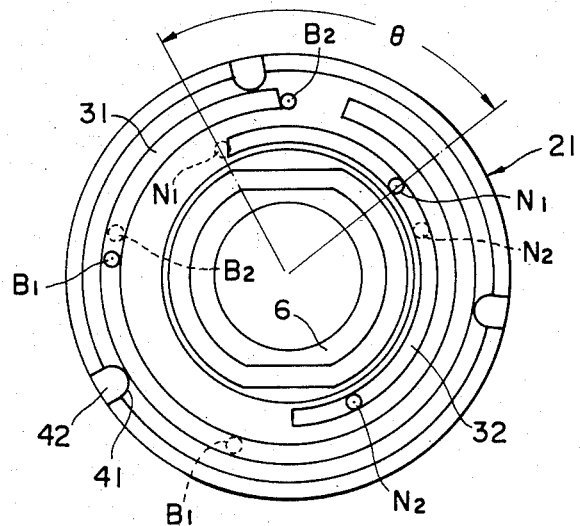
Figure 10:
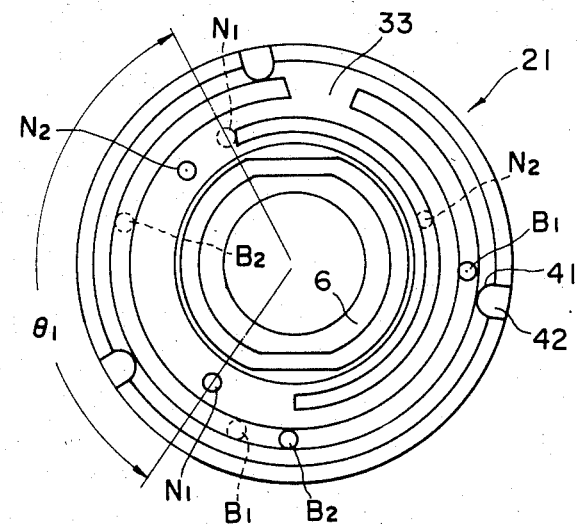

In the meanwhile, the positions of contact between the contact pieces 36 and the printed circuit 33 change as described below. FIGS. 8 to 10 show the positions of contact between the contact pieces 36 and the printed circuit 33 when the mirror body 3 is in the neutral position, the position of the rear turning limit and the position of the front turning limit. The central point of each mark in FIGS. 8 to 10 shows the position of contact.

When the mirror body 3 is in the neutral position (FIG. 8), both the contacts $B_1$ and $B_2$ are in contact with the outer conductive plate 31 and said switch for detecting the position of the rear turning limit is closed. However, the contact $N_1$ is not in contact with the inner conductive plate 32 and said switch for detecting the neutral position is open. Therefore, the DC electric motor 15 is stopped and the mirror body 3 is kept in the neutral (erected) position. In this state, if the operation switch (not shown) is turned on, the DC electric motor 15 is actuated and the mirror body 3 is turned backward because said switch for detecting the rear turning limit is closed. At this time, the contact pieces 36 turn clockwise.

When the mirror body 3 is turned by an angle $\theta$ from the neutral position to the position shown in FIG. 9, the contacts $N_1$, $N_2$ are in contact with the conductive plate 32 and the switch for detecting the neutral position is closed. Also, the contact $B_1$ is in contact with the conductive plate 31, but the contact $B_2$ is not in contact with the conductive plate 31, thus the switch for detecting the rear turning limit being open. Therefore, the DC electric motor 15 is stopped and the mirror body 3 is kept in the position of the rear turning limit. In this state, if the operation switch is turned on again, the DC electric motor 15 is reversed. Thus, the contact pieces 36 are turned counterclockwise and the mirror body 3 is returned to the neutral position.

FIG. 10 shows the positional relation between the contacts $N_1$, $N_2$, $B_1$, $B_2$ and the conductive plates 31, 32 when the mirror body 3 is in the position of the front turning limit. In the illustrated example, the mirror body 3 cannot be turned forward by automatic operation. However, it is possible to manually disengage the upper clutch 25a and lower clutch 25b and turn the mirror body 3 forward from the neutral position by an angle $\theta_1$. In FIG. 10, the contacts $N_1$, $N_2$ are not in contact with the conductive plate 32 and the switch for detecting the neutral position is open, while the contacts $B_1$, $B_2$ are in contact with the conductive plate 31 and the switch for detecting the position of the rear turning limit is closed. In this state, if the operation switch is turned on, the mirror body 3 is turned from the position of the front turning limit to the neutral position (the contact pieces 36 turn clockwise). When the mirror body 3 is between the neutral position and the position of the rear turning limit, both the switch for detecting the neutral position and the switch for detecting the rear turning limit are closed.

Advantages of the Invention

According to the present invention, the mirror body can be turned by remotely controlling the electric driving means contained in the mirror body. The door mirror has means for automatically stopping the electric driving means, said stopping means being disposed between one surface of a fixed clutch fixed to the upper end of said shaft and a surface of a mirror body opposing said one surface of the fixed clutch, said stopping means comprising a printed circuit and contact pieces slidable thereon. Therefore, in the position of the turning limit, the switch for detecting the position of the turning limit is open, and the mirror body is automatically stopped and kept in this position. If the electric driving means is reversed by means of the operation switch, the mirror body is turned from the position of the turning limit to the neutral (erected) position and kept in the neutral position. Furthermore, since the pinion fixed to the output shaft of the electric driving means is engaged with the clutch gear attached to the upper portion of the shaft, the mirror body is given relative rotation on the shaft and is surely turned.

What is claimed is:

1. An electrically foldable door mirror comprising a base, a shaft erected on said base, a mirror body rotatably attached to said shaft, electric driving means for turning said mirror body, a pinion secured to the output shaft of said electric driving means, said pinion being engaged with a clutch gear attached to the upper portion of said shaft, means for automatically stopping said electric driving means, said stopping means being disposed between one surface of a fixed clutch fixed to the upper end of said shaft and a surface of said mirror body opposing said one surface of the fixed clutch, said stopping means comprising a printed circuit and contact pieces slidable thereon.

2. An electrically foldable door mirror as claimed in claim 1, wherein said mirror body has a recess in a position opposing the upper end of said shaft, and a holder of contact pieces is engaged with said recess.

3. An electrically foldable door mirror as claimed in claim 2, wherein said holder holds four contact pieces consisting of a pair of contact pieces for detecting the erected position of said mirror body and another pair of contact pieces for detecting the position of the rear turning limit of said mirror body.

4. An electrically foldable door mirror as claimed in claim 3, wherein said printed circuit has two arc-shaped conductive plates having different radii, one being disposed on the inside of the other, all of said contact pieces being in contact with said printed circuit when said mirror body is in a movable range, one of said two pairs of contact pieces being disconnected from said printed circuit when said mirror body is in the erected position or in the position of the turning limit.

* * * * *